B. M. STANLEY.
CHECK ROW SEED PLANTER.
APPLICATION FILED APR. 11, 1912.
1,060,372.
Patented Apr. 29, 1913.
2 SHEETS—SHEET 2.
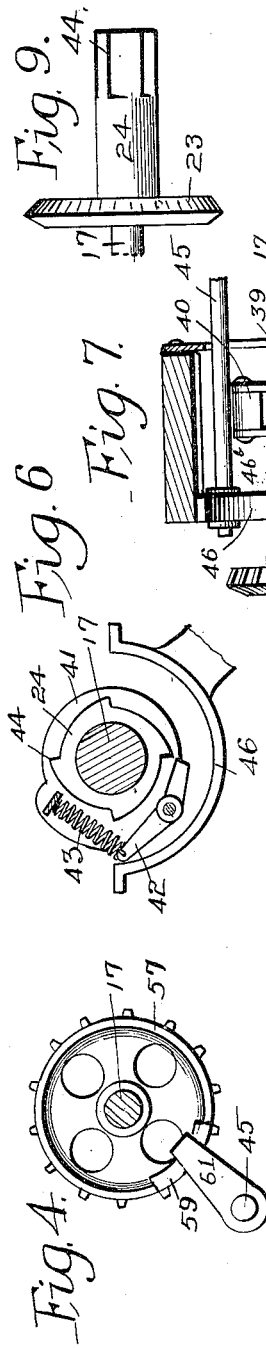
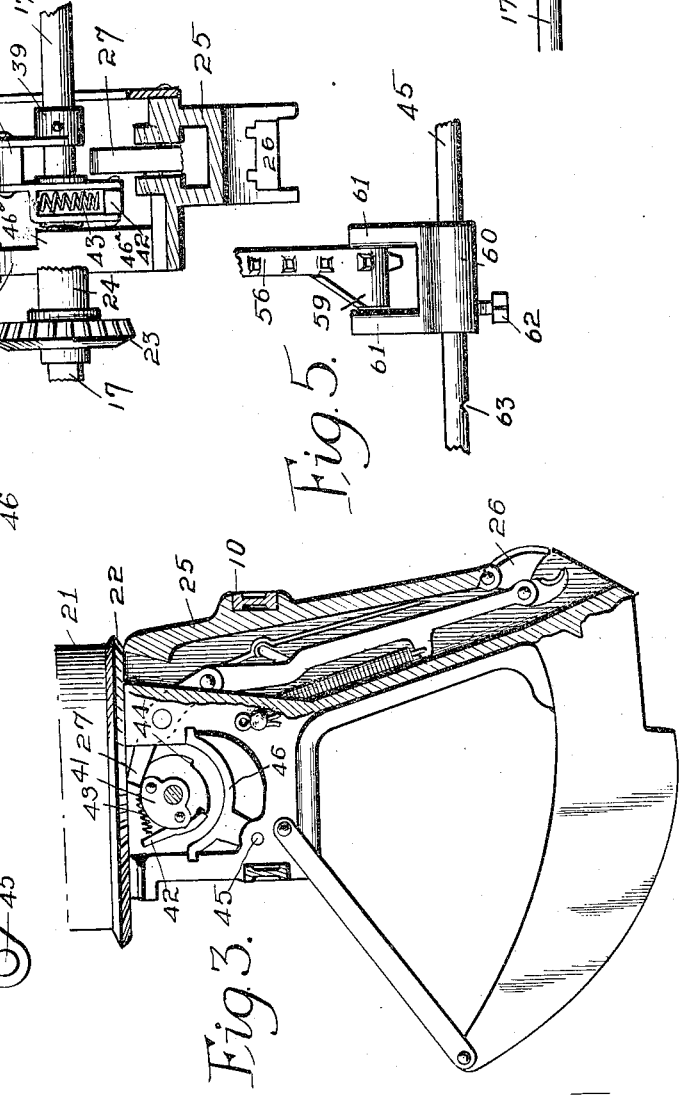
Witnesses
A. G. Hague
W. A. Loftus
Inventor
Blaine M. Stanley
by Onrigo Bair atty

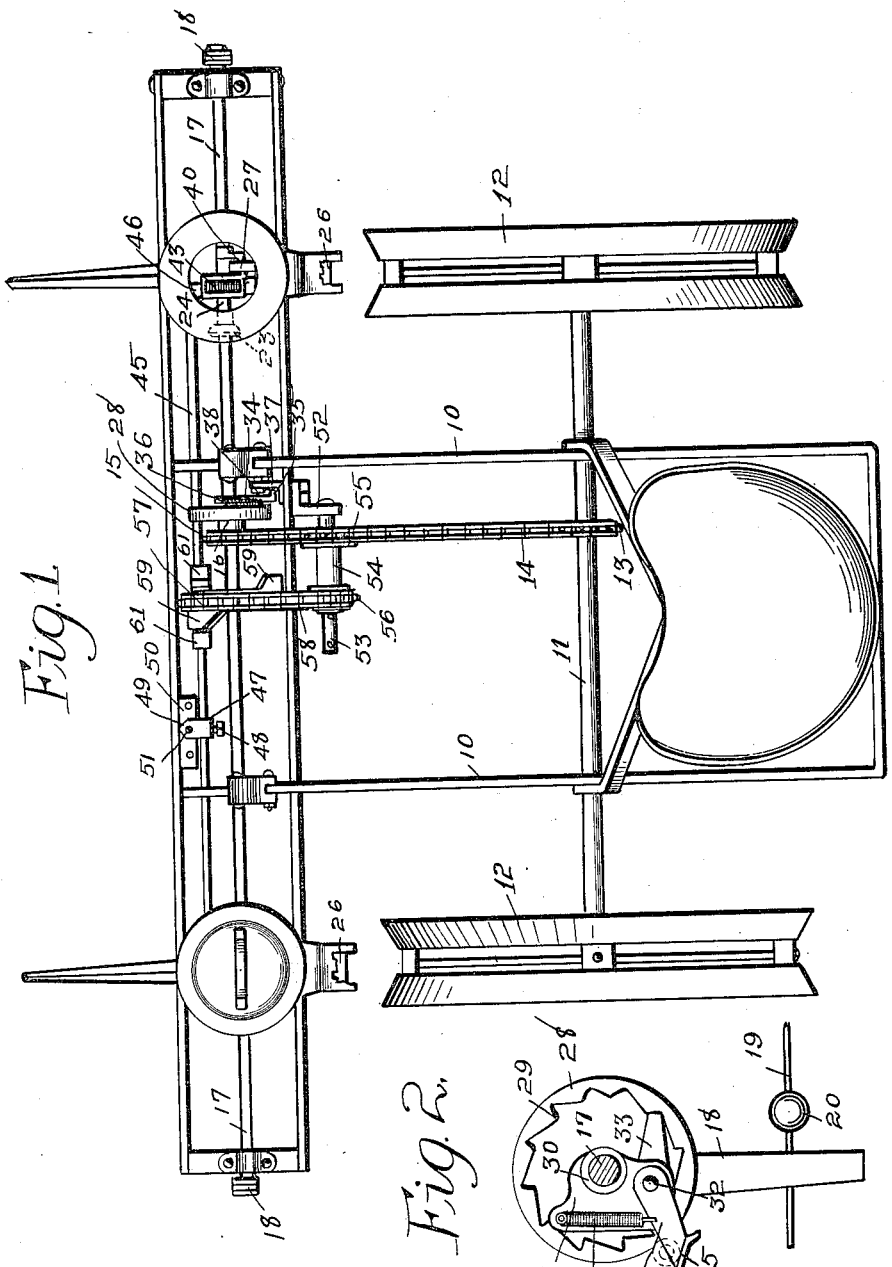

UNITED STATES PATENT OFFICE.

BLAINE M. STANLEY, OF DES MOINES, IOWA.

CHECK-ROW SEED-PLANTER.

1,060,372.  Specification of Letters Patent.  Patented Apr. 29, 1913.

Application filed April 11, 1912. Serial No. 690,162.

*To all whom it may concern:*

Be it known that I, BLAINE M. STANLEY, a citizen of the United States, residing at Des Moines, in the county of Polk and State of Iowa, have invented a certain new and useful Check-Row Seed-Planter, of which the following is a specification.

My invention relates to that class of check row seed planters in which power is derived from the supporting wheels to rotate the dropping plate in the bottom of the seed hopper whereby one seed at a time is dropped from the hopper into a valve in the planter leg, whereby a given number of seeds say, for instance, four is dropped into the planter leg during the time that the machine is advancing from one hill to the next. In planters of this class it is customary to stretch a knotted wire across the field to be planted and to have means provided whereby the knots on the wire will engage a trip device and open the valve in the planter leg so that the seeds deposited upon said valve will be planted in the furrow at distances spaced apart measured by the distance between the knots on the wire.

Under certain conditions and in certain localities the best results are obtained by planting a certain predetermined number of seeds, say for instance three, in each hill and in other instances and in other localities three seeds in each hill would be too many for producing the best results.

My object is to provide means of simple, durable and inexpensive construction that may be used in the nature of an attachment on ordinary seed planters, whereby the device may be set to automatically plant a certain predetermined number of seeds in one hill, say for instance two, and a certain predetermined number of seeds in the next hill, say for instance three, and to continue this change in the number of seeds alternately during the operation of the machine.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of a part of an ordinary seed planter having my attachment applied thereto. Fig. 2 shows a detail view illustrating the trip device for connecting the constantly driven wheel on the trip shaft with the trip shaft. Fig. 3 shows an enlarged, detail view, partly in section, illustrating a part of the planter leg, the valve mechanism therein and the mechanism for controlling the amount of movement imparted to the trip shaft. Fig. 4 shows a detail side view illustrating the sprocket wheel on the trip shaft and the arms on the slide shaft. Fig. 5 shows a detail, edge view illustrating a part of the sprocket wheel on the trip shaft and the arms on the slide shaft. Fig. 6 shows a detail, side view, partly in section, illustrating the means for holding the spring actuated pawl out of engagement with the ratchet wheel on the trip shaft. Fig. 7 shows a detail, plan view of one end of the trip shaft and one end of the slide shaft and illustrating the means for governing the movement of the trip shaft by an adjustment of the slide shaft. Fig. 8 shows an edge view of a part of the trip shaft with the constantly driven wheel thereon and the means for controlling the movement of the trip shaft, and Fig. 9 shows a detail view of the ratchet sleeve on the trip shaft.

Referring to the accompanying drawings, I have used the reference numeral 10 to indicate the frame of the machine mounted upon the rotatable axle 11 having supporting or traction wheels 12 fixed to its ends. A sprocket wheel 13 is fixed to the axle 11 and is connected by a sprocket chain 14 with a sprocket wheel 15, which latter is mounted on a sleeve 16, which sleeve is rotatable on the trip shaft 17. This trip shaft 17 extends transversely of the machine and runs under the seed hoppers. The mechanism at each end of the trip shaft is the same so that one set of said mechanism will be hereinafter described.

On the end of the trip shaft is a downwardly projecting forked arm 18 designed to receive a trip wire 19 having knots 20 thereon. Above the trip shaft 17 is a seed hopper 21 having a dropping plate of ordinary construction and provided with a beveled gear wheel 22. This beveled gear wheel is in mesh with a similar beveled gear wheel 23 that is rotatably mounted upon a sleeve 24 on the trip shaft 17, which sleeve is designed to be driven by power from the trip shaft in a manner to be hereinafter more fully described. When said sleeve 24 is rotated however the gear wheel is also rotated and seeds are caused thereby to be dropped from the seed hopper one at a time at certain intervals. The particular construction of the seed dropping plates forms no part of this invention and is therefore not herein illustrated or described. Any of the ordinary seed dropping devices may be employed. After the seeds drop from the hopper they enter the planter leg 25 and are retained near the bottom of the planter leg by a valve device 26, which valve device is operated by the lever 27 in the manner to be hereinafter described. The valve device of itself forms no part of my present invention and any of the ordinary forms of valve devices may be employed. The means by which motion is transmitted from the constantly driven sleeve 16 to the trip shaft is as follows: Mounted on the sleeve 16 is a wheel 28 having internal ratchet teeth 29. Mounted on the shaft 17 adjacent to the wheel 28 is a hub 30 having an arm 31 thereon in which arm a rock shaft 32 is mounted. On one end of the rock shaft 32 is a pawl 33 to engage the ratchet teeth 29 and on the other end is a lever 34 having a lateral extension 35 thereon. A spring 36 is attached to the lever 34 and to the arm 31 to thereby normally hold the pawl 33 in engagement with the ratchet teeth 29. Fixed to the machine frame in the path of the lateral extension 35 is an arm 37 having a roller 38 thereon to engage the extension 35. The operation of this part of the device is as follows: Assuming that the wheel 28 is constantly rotating and that the extension 35 is engaged by the roller 38 in such a manner as to hold the pawl 33 away from the ratchet teeth 29, then when the trip arm 18 is engaged by a knot on the check wire the shaft 17 will be moved rearwardly a part of a revolution. This will cause the extension 35 to move past the roller 38. As soon as it has passed the roller 38, the spring 36 will throw the pawl 33 into engagement with the constantly moving ratchet wheel 28, and hence the hub 30 will be carried with the ratchet wheel 28 one complete revolution or until the extension 35 again engages the roller 38 and holds the pawl 33 away from the ratchet teeth 29. Hence each time that a knot on the check wire engages the trip lever 18 the shaft 17 will turn one complete revolution and will then stop while the wheel 28 will continue to rotate until another knot on the check wire is reached.

In order to provide for dropping either two, three or four seeds (or any other predetermined number) from the seed box or hopper for each revolution of the trip shaft 17 I employ the following mechanism: Fixed to the trip shaft 17 is a hub 39 having a roller 40 thereon designed to engage the valve lever 27. This hub 39 also carries a disk 41, which disk has a pawl 42 pivoted to it and said pawl is provided with an extensible spring 43, the other end of which engages a lug on the disk 41. This spring 43 normally holds the pawl 42 toward the shaft 17. Rotatably mounted upon the shaft 17 is the sleeve 24 before referred to and this sleeve is provided, as shown in Fig. 6, with four ratchet teeth 44 designed to be engaged by the pawl 42. Therefore during each revolution of the shaft 17 and so long as the pawl 42 is in engagement with the ratchet teeth 44 the sleeve 24 will rotate in unison with the shaft 17. Obviously if the pawl 42 is held out of engagement with the ratchet teeth 44 during a part of a revolution the sleeve 24 will only rotate part of a revolution.

I have provided for holding the pawl 42 out of engagement with the ratchet teeth 44 during a quarter or less part of a revolution of the shaft 17 as follows: Mounted in the machine frame a short distance in front of the shaft 17 is a slide shaft 45 arranged for longitudinal movement. This shaft is provided with a curved arm 46 extended rearwardly. This curved arm is provided with a part 46$^a$ that is substantially semi-circular and it is also provided with a lateral extension 46$^b$ that is somewhat less than a half circle. The said curved arm 46 is so arranged with relation to the pawl 42, as will be seen in Fig. 6, that when the curved arm 46 is in position directly beneath the pawl 42 the said pawl will be engaged by said curved arm and the spring 43 will be compressed in such a manner as to hold the pawl 42 out of engagement with the ratchet teeth 44. When the part 46$^b$ of the curved arm 46 is engaged by the pawl 42 then the pawl will be held away from the sleeve 24 during that period of the movement of the said sleeve that will cause the pawl to miss one of the ratchet teeth 44. Hence the sleeve 24 will be turned by the shaft 17 only three fourths of a revolution and when the part 46$^a$ of the arm 46 is in position to engage the pawl 42 then the said pawl will be held away from the sleeve 24 during that part of a revolution of the shaft 17 that will cause the pawl 42 to pass two of the teeth 44, and under these circumstances the sleeve 24 will be turned only one half of a revolution. The gearing ratio between the beveled gear wheel 23 and the beveled gear wheel 22 is such that when the sleeve 24 is turned a half revolution two seeds will be dropped. When turned three fourths of a revolution three seeds will be dropped and when the sleeve 24 rotates in unison with the shaft 17, four seeds will be dropped for each revolution of the shaft 17. It is obvious in this connection that the seed dropping plates may be so arranged as to drop different numbers of seeds for each part of a revolution and the foregoing is given only as an example of the way I prefer to arrange these parts in connection with a seed planter for corn.

From the foregoing description it is obvious that by shifting the slide shaft 14 longitudinally the planter may be made to drop either two, three or four seeds each time that the shaft 17 is turned a complete revolution and that said shaft 17 is turned one complete revolution each time that the trip arm 18 engages a knot on the check wire.

In order that the slide shaft 45 may be set in any of the positions before mentioned, I have provided on said shaft an adjustable collar 47 provided with a set screw 48 and also with an extension 49 having an opening therein and on the frame is a plate 50 having three openings therein. A pin 51 is provided to extend through the opening in the extension 49 into one or the other of the openings in the plate 50 to thereby adjustably hold the slide shaft 45 in any of its three positions of adjustment.

The essential feature of my invention consists in the providing of means for automatically shifting the slide shaft 45 immediately after each revolution of the trip shaft 17 so that in each alternate hill that is planted there will be a different number of seeds; for instance, two in one hill and three in the next, or three in one hill and four in the next. This I accomplish by means of the following mechanism: Mounted on the machine frame is a bracket 52 in which is supported a short shaft 53. Slidingly and rotatably mounted upon this shaft 53 is a sleeve 54 having two sprocket wheels 55 and 56 thereon. The sprocket wheel 55 is so arranged that it may be driven by the chain 14. However when it is desired to throw the sprocket wheel 55 out of operation the chain 14 is removed from engagement with the sprocket wheel 55 and the sleeve 54 is shifted laterally on the shaft 53 until the sprocket wheel 55 is out of engagement with the chain 14. Rotatably mounted upon the trip shaft 17 is a sprocket wheel 57 connected by a sprocket chain 58 with the sprocket wheel 56. This sprocket wheel 57 is provided on each side with an inclined laterally extending lug 59 arranged at points diametrically opposite to each other. Adjustably mounted upon the slide shaft 45 is a sleeve 60 having two upwardly extending arms 61 spaced apart from each other far enough to admit the sprocket wheel 57 and one of the lugs 59. This sleeve 60 is adjustably fixed to the shaft 45 by the set screw 62. I preferably form notches 63 in the shaft 45 to receive the set screw 62 so that the operator may accurately position the sleeve 60 on the shaft 45. Said notches are so arranged that when the set screw is in one of them the sleeve 60 will be in such position that it will alternately plant, say for instance, two and three seeds and when in another position it will alternately plant, say for instance, three and four seeds. When the device is set to automatically change the number of seeds planted in each hill the pin 51 is of course removed. In practical operation with this part of my device and assuming that the sprocket wheel 55 is in engagement with the sprocket chain 14, the proportions of said sprocket wheels are such that the large sprocket wheel 57 will be rotated one half a revolution during the time that the machine is advancing from one hill to the next. As has been before explained the number of seeds planted in each hill is determined by the position of the slide shaft 45 which adjusts the curved arm 46 with relation to the pawl 42. It is obvious that when one of the lugs 49 engages the arm 61 of the sleeve 60, it will move the shaft 45 to such position that the curved arm 46 will cause a certain predetermined number of seeds to drop into the planter leg between two hills, and when the next lug 59 engages the other arm 61 it will slide the shaft 45 back far enough to adjust the arm 46 in such a manner that a different predetermined number of seeds will be dropped in the planter leg while the machine is moving between the next two hills. Therefore when the sprocket wheel 56 is being rotated the slide shaft 49 will be shifted in one direction when one of the lugs 59 strikes it, and it will be shifted in the opposite direction when the other of the lugs 59 strikes it.

If it is desired to plant a predetermined number of seeds in all of the hills of a row, the sleeve 54 is shifted to its inoperative position and the pin 51 is inserted in the proper one of the openings in the plate 50 so that said slide shaft is thereby held rigidly in one position.

I do not desire to be understood as limiting myself to the employment of the specific seed dropping mechanism herein illustrated and described nor to the specific details of the means for alternately changing the number of seeds at each hill.

I claim as my invention:

1. In a check row planter, the combination of means for dropping a predetermined number of seeds during the time that the planter is advancing a predetermined distance, means for varying the number of seeds that will be dropped by the planter during the time that it is advancing a predetermined distance, and means automatically actuated by the advance of the planter for adjusting said varying means during the time that the planter is advancing from one predetermined distance to the next predetermined distance so that a given number of seeds may be planted in one hill and another number in the next.

2. In a check row seed planter, the combination of means for planting a predetermined number of seeds at points equally spaced apart during the advance of the machine, an adjusting means capable of varying the number of seeds planted at one point, and means automatically actuated by the machine for operating said adjusting means to thereby change the number of seeds planted at each alternate predetermined point.

3. In a machine of the class described, the combination of means for dropping a predetermined number of seeds at points equally spaced apart, an adjusting means for varying the number of seeds dropped between said points, a sliding shaft for operating said adjusting means, and means automatically actuated by the advance of the machine for reciprocating said sliding shaft.

4. In a machine of the class described, the combination of means for dropping a predetermined number of seeds at points equally spaced apart, an adjusting means for varying the number of seeds dropped between said points, a sliding shaft for operating said adjusting means, and means automatically actuated by the advance of the machine for reciprocating said sliding shaft, said means comprising a wheel operatively connected with a supporting wheel of the machine and having inclined lugs on opposite sides, a sleeve fixed to said slide shaft and provided with arms to be engaged by said inclined lugs, for the purposes stated.

5. In a machine of the class described, the combination of means for dropping a predetermined number of seeds at points equally spaced apart, an adjusting means for varying the number of seeds dropped between said points, a sliding shaft for operating said adjusting means, and means automatically actuated by the advance of the machine for reciprocating said sliding shaft, said means comprising a wheel operatively connected with a supporting wheel of the machine and having inclined lugs on opposite sides, a sleeve fixed to said slide shaft and provided with arms to be engaged by said inclined lugs, and means for adjustably fixing said sleeve to the slide shaft.

6. In a check row planter, the combination of a frame, supporting wheels therefor, seed dropping mechanism, means for operating said seed dropping mechanism to drop a predetermined number of seeds at distances equally spaced apart, an adjusting means for varying the number of seeds to be dropped by the machine at said points, a slide shaft for controlling said adjusting means, a sleeve adjustably fixed to the slide shaft and having two arms thereon, a sprocket wheel having inclined lugs thereon rotatably supported in position to engage said arm and to thereby reciprocate the slide shaft, a sprocket chain driven by power from a supporting wheel, a shaft, a sleeve slidingly and rotatably mounted on the shaft and having two sprocket wheels thereon, one of said sprocket wheels being in position to be engaged by said sprocket chain, and a sprocket chain connecting the other one of said sprocket wheels on the sleeve with the sprocket wheel having the inclined lugs.

Des Moines, Iowa, April 6, 1912.

BLAINE M. STANLEY.

Witnesses:
M. WALLACE,
W. A. LOFTUS.

---

Copies of this patent may be obtained for five cents each, by addressing the "Commissioner of Patents, Washington, D. C."